Sept. 13, 1960    W. R. WOOTTON    2,952,602
NUCLEAR REACTOR VAPOUR-GENERATING AND POWER PLANT
Filed May 28, 1958    4 Sheets-Sheet 1

Inventor
William R. Wootton
By
Pennie Edmonds Morton Barrows & Taylor
Attorneys

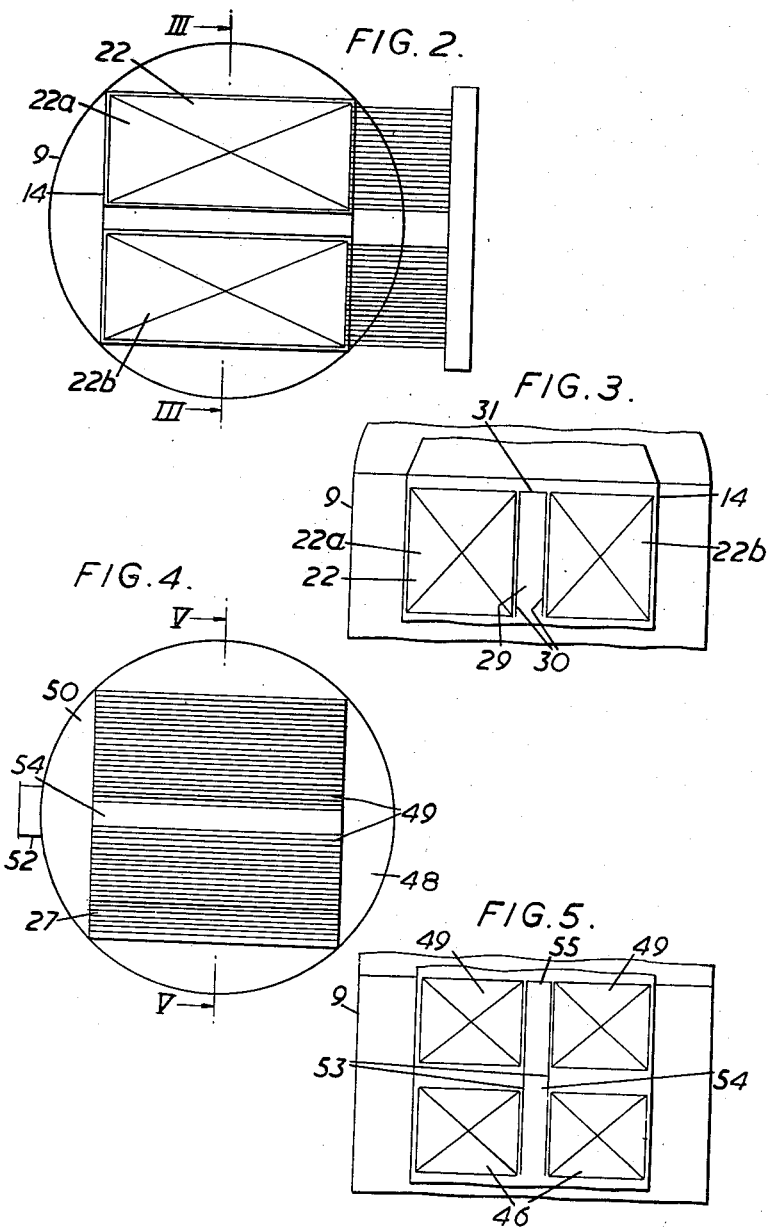

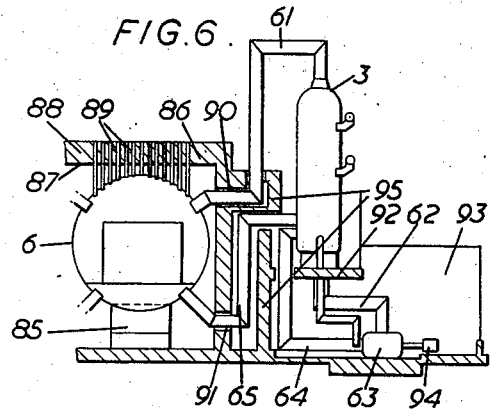
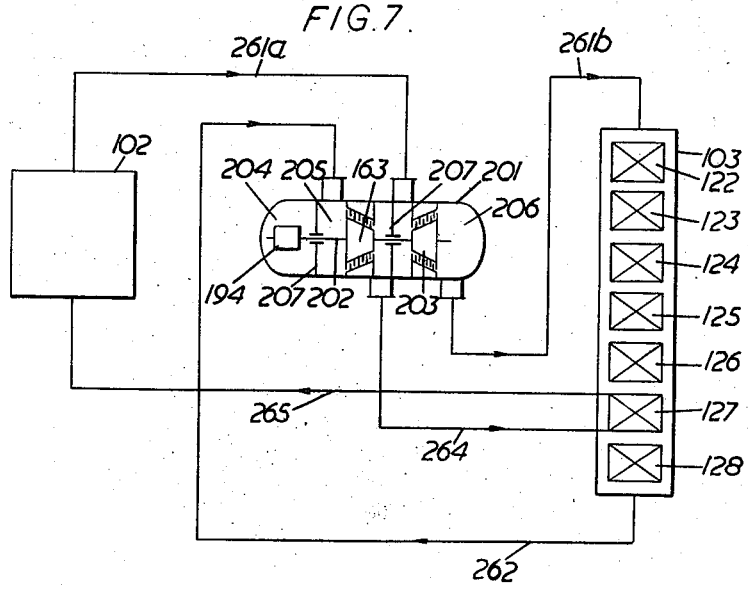

Sept. 13, 1960 W. R. WOOTTON 2,952,602
NUCLEAR REACTOR VAPOUR GENERATING AND POWER PLANT
Filed May 28, 1958 4 Sheets-Sheet 4

United States Patent Office 2,952,602
Patented Sept. 13, 1960

2,952,602

NUCLEAR REACTOR VAPOUR GENERATING AND POWER PLANT

William R. Wootton, London, England, assignor to Babcock & Wilcox Limited, London, England, a British company Filed May 28, 1958, Ser. No. 738,434

Claims priority, application Great Britain June 3, 1957

15 Claims. (Cl. 204—193.2)

This invention relates to an improved method of generating vapour under pressure and to nuclear reactor vapour generating and power plant and particularly to plant of the kind including a gas-cooled nuclear reactor and a compressor arranged to effect circulation of gaseous coolant in a closed circuit through the nuclear reactor and through heat exchange means including a vapour generator. In such plant the requisite power input to the compressor represents a substantial fraction of the heat output of the reactor wherefore the fraction of the power developed in the nuclear reactor that is available as output of the prime mover operated by the generated vapour is undesirably small and in practice this disadvantage is aggravated by the use of an electric driving motor and the consequent loss entailed in the conversion of heat to mechanical power at the output shaft of the motor.

Since the power consumed by a compressor is directly proportional to the absolute temperature of the gases being compressed, the power absorbed can be lessened by reducing the coolant temperature at the entry to the compressor. However, a reduction in coolant temperature at the entry to the nuclear reactor results in a correspondingly lower vapour pressure and a consequent reduction in the thermo-dynamic efficiency of the vapour cycle. Moreover, too low a coolant temperature at the gas entry to the reactor may be undesirable in view of the Wigner effect, i.e., the displacement under the influence of radiation, capable of leading to macroscopic deformations, of the atomic constituents of crystalline solids, e.g., moderator graphite, from their positions in the crystals, which effect tends to be greater the lower the temperature. It will be appreciated therefore that means capable of enabling the compressor to operate at a low temperature whilst delivering coolant to the nuclear reactor at a relatively high temperature and without utilising an auxiliary source of heat would be of great practical importance.

Where possible, instead of driving the compressor by an electric motor, to utilise a gas turbine extracting energy from the coolant, the overall efficiency of the vapour generating plant would be greatly increased. Hitherto, however, the limited temperature of the coolant at the outlet from the nuclear reactor and the high power taken to drive the compressor have rendered the use of a gas turbine impracticable. When, however, the compressor may be operated at a suitably low temperature and at the same time an optimum coolant temperature at the outlet of the nuclear reactor may be maintained the use of a gas turbine for driving the compressor becomes a possibility.

The present invention includes vapour generating plant including a gas-cooled nuclear reactor and a compressor arranged to effect circulation of gaseous coolant in a closed circuit through the nuclear reactor and through heat exchange means which are adapted to reduce the temperature of the coolant entering the compressor to a fully cooled value substantially below the coolant inlet temperature at the entry to the nuclear reactor and which include a vapour generator, the compressor being arranged to discharge coolant to a part of the heat exchange means adapted to raise the temperature of the fully cooled coolant flowing from the compressor to the nuclear reactor by effecting heat exchange between the fully cooled coolant and partially cooled coolant flowing to the compressor.

The invention also includes vapour generating plant including a gas-cooled nuclear reactor, a compressor arranged to effect circulation of gaseous coolant in a closed circuit through the nuclear reactor and through heat exchange means which are adapted to reduce the temperature of the coolant entering the compressor to a fully cooled value substantially below the coolant inlet temperature at the entry to the nuclear reactor and which include a vapour generator and a gas turbine disposed in the circuit between the nuclear reactor and the heat exchange means and arranged to deliver driving power to the compressor which is arranged to discharge coolant to a part of the heat exchange means adapted to raise the temperature of the fully cooled coolant flowing from the compressor by effecting heat exchange between the fully cooled coolant and partially cooled coolant flowing to the compressor.

The invention moreover includes the method of generating vapour under pressure in which a gaseous coolant is subjected to compression and is thereby caused to flow through and is heated in a nuclear reactor and circulated in a closed circuit including the nuclear reactor and heat exchange means by which the temperature of the coolant is regulated to a suitable value at the inlet to the nuclear reactor, the coolant in flowing from the nuclear reactor to the heat exchange means is subject to a power extraction expansion process whereby power is derived for utilization in effecting compression of the coolant, in passing through the heat exchange means heat is extracted from the coolant to effect generation of vapour and to reduce the temperature of the coolant prior to compression thereof to a value substantially below the said predetermined temperature and, after compression, the coolant flowing to the nuclear reactor is heated by heat exchange with coolant passing, prior to the compression and after loss of heat therefrom in vapour generation, through the heat exchange means.

The invention also includes nuclear reactor power plant comprising a nuclear reactor adapted to be gas-cooled, a compressor for nuclear reactor gaseous coolant, heat exchange means including vapour generating surfaces, low temperature heat exchange surfaces, and a gas-to-gas heat exchanger, gas conduit means arranged for leading nuclear reactor gas coolant in a closed circuit from the nuclear reactor gas coolant outlet past the vapour generating surfaces, through one gas side of the gas-to-gas heat exchanger, past the low temperature heat exchange surfaces, through the compressor, through the other gas side of the gas-to-gas heat exchanger, and to the nuclear reactor gas coolant inlet, a prime mover operated by vapour, a pump for vapour generator working fluid, and conduit means arranged for leading vapour generator working fluid in a second closed circuit which includes the vapour generating surfaces, the prime mover, and the pump.

The nuclear reactor is, for example, a heterogeneous, graphite moderated reactor utilizing carbon dioxide, hydrogen or helium as a coolant and suitably the vapour generator is a tubulous steam boiler.

Suitably, the gas-to-gas part of the heat exchange means, which on the one hand assists in cooling the gaseous coolant before such coolant reaches the compressor and on the other hand reheats the gaseous coolant after it has left the compressor and before it reaches the nuclear reactor gas inlet, is disposed in the coolant flow path at the side of an economiser remote from the compressor.

In one embodiment, the heat exchange means include boilers adapted to operate at different pressures and to supply steam to steam turbines at different pressure stages thereof, the boilers being disposed in succession in the coolant flow path and each succeeding boiler giving lower pressure steam than the preceding boiler. Plural pressure boilers of this nature are described and claimed in the specification of British Patent No. 738,286. The gas-to-gas part of the heat exchange means which on the one hand assists in cooling the gaseous coolant and on the other hand subsequently reheats it, in the embodiment in question is disposed between the lower or lowest pressure boiler and an economiser which serves all of the boilers.

The invention will now be described, by way of example, with reference to the accompanying diagrammatic drawings, in which:

Figure 2 is a plan view of the heat exchanger tower in section on the line II—II of Figure 1;

Figure 3 is an elevation of part of the heat exchanger tower in section on the line III—III of Figure 2;

Figure 4 is a plan view of the heat exchanger tower on the line IV—IV of Figure 1;

Figure 5 is an elevation of part of the heat exchanger tower in section on the line V—V of Figure 4;

Figure 6 is a sectional elevation of part of a nuclear power station, comprising the reactor and one of a number of heat exchanger towers;

Figure 7 shows a nuclear reactor coolant gas circuit which includes a heat exchanger tower containing elements of two steam boilers and which includes a coolant gas turbine mechanically coupled to a coolant gas compressor.

Figure 1:
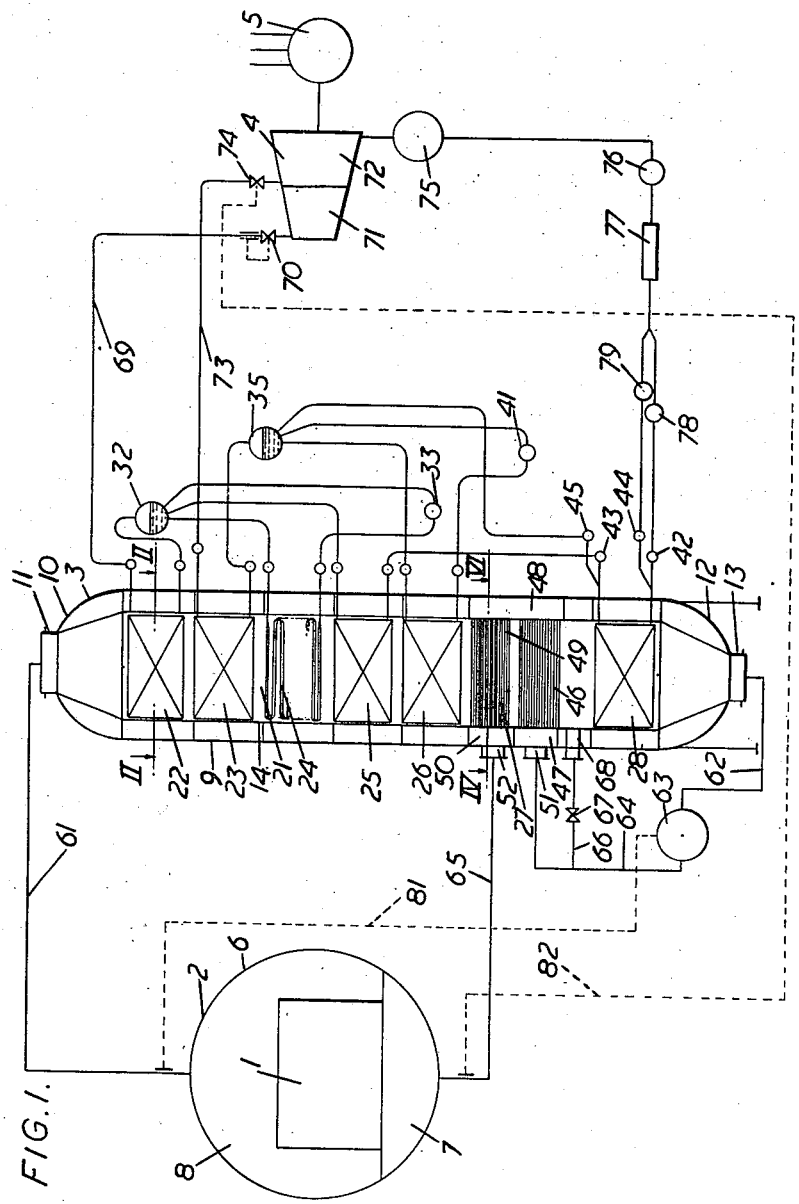
Figure 1 shows two steam boilers adapted to operate at two different pressures and having their heat exchange elements in a heat exchange tower indicated in sectional elevation and shows a nuclear reactor coolant gas circuit including the heat exchanger tower and indicates the utilisation of the generated steam in a steam turbine.

Referring to Figures 1 to 5 of the drawings, power generated in the form of heat in the core 1 of a gas-cooled, graphite-moderated natural uranium reactor 2 is converted to electric power by means of steam generating and superheating means located in a heat exchanger tower 3 and receiving heat from the reactor coolant gases, a two-stage steam turbine 4 receiving superheated steam from the steam generating means, and an electric generator 5 driven by the steam turbine.

The reactor core comprises a graphite block assembly of cylindrical form supported with its axis vertical within a spherical pressure vessel 6, and pierced by a multiplicity of channels parallel with the core axis which house canned uranium fuel elements and which provide passages for the flow past the fuel elements of carbon dioxide coolant gas to remove the heat generated in the fuel elements. Partitions within the pressure vessel define a coolant gas inlet space 7 in the lower part of the pressure vessel in communication with the lower ends of the core channels and a coolant gas outlet space 8 in the upper part of the pressure vessel in communication with the upper ends of the core channels.

The heat exchanger tower consists of a cylindrical shell 9 having an upper dished end 10 formed with a coolant gas inlet 11 and a lower dished end 12 formed with a coolant gas outlet 13, partitioning 14 to define within the tower a vertical coolant gas passage 21 of square cross-section and seven heat exchange units 22 to 28 arranged in successive heat exchange relation with the coolant gas flow in the passage 21. The heat exchange units 22 to 26 and 28 provide the heat exchange elements of a boiler adapted to operate at a relatively higher pressure and of a boiler adapted to operate at a relatively lower pressure. Each of the heat exchange units 22 to 26 consists of a bank of tubes, each tube extending from a lower, inlet header of the appropriate heat exchange unit through the cylindrical wall 9 of the heat exchanger tower, then in a plurality of loops extending backwards and forwards across the gas flow passage 21 and finally extending through the cylindrical wall 9 of the heat exchanger tower to an upper, outlet header of the appropriate heat exchange unit. Each tube bank consists of two tube bank sections side by side separated by a narrow vertical space bounded laterally by partitions and normally closed, in order to prevent the passage of gas therethrough, by a plate at the upper end of the space; reference may be had to Figures 2 and 3 in which the two sections 22a and 22b of the tube bank of the heat exchange unit 22 are separated by a narrow vertical space 29 bounded by partitions 30 and closed upwardly by a plate 31.

The high pressure boiler includes a steam and water drum 32, arranged outside the heat exchanger tower 3, which is connected to receive a steam and water mixture from the outlet header of the heat exchange unit 24, in which water is evaporated; the drum 32 is connected to pass water from its water space to the inlet of a high pressure circulating pump 33, the outlet of which is connected to the inlet header of the heat exchange unit 24. The steam outlet from the drum 32 is connected with the inlet header of the heat exchange unit 22, in which steam is superheated.

The low pressure boiler includes a steam and water drum 35 also arranged outside the heat exchanger tower 3, and which is connected to receive its steam and water mixture from the outlet header of the heat exchanger unit 26, in which water is evaporated; the drum 35 is connected to pass water from its water space to the inlet of a low pressure circulating pump 41 the outlet of which is connected to the inlet header of the heat exchange unit 26. The steam outlet from the drum 35 is connected to the inlet header of the heat exchange unit 23 in which steam is superheated.

The heat exchange unit 28, which is adapted to provide a primary economiser for the high pressure boiler and to provide an economiser for the low pressure boiler, is constructed similarly to the heat exchange units 22 to 26 except that two inlet and two outlet headers are provided. Thus, some of the tubes of the heat exchange unit 28 connect at their inlet ends with a high pressure inlet header 42 and at their outlet ends with a high pressure outlet header 43, while the remaining tubes connect at their inlet ends with a low pressure header 44 and at their outlet ends with a low pressure outlet header 45. The outlet header 43 is connected with the inlet header of the heat exchange unit 25, which is adapted to provide a secondary economiser for the high pressure boiler, the outlet header of which unit is connected with the high pressure steam and water drum 32. The outlet header 45 is connected with the low pressure steam and water drum 35.

The heat exchange unit 27 comprises a lower bank 46 of tubes extending across the coolant gas passage 21 between an inlet manifold chamber 47 to one side of the passage 21 and the lower part of a return manifold chamber 48 to the opposite side of the passage 21, and an upper bank 49 of tubes extending between the upper part of the return manifold chamber 48 and an outlet manifold chamber 50 above the inlet manifold chamber 47 to a side of the passage 21; the cylindrical wall 9 of the heat exchanger tower 3 is formed with an inlet 51 to the chamber 47 and an outlet 52 from the chamber 50. Each of the banks 46 and 49 consist of two bank sections side by side but spaced apart so that vertical partitions 53 may define a narrow vertical space 54 extending from the top of the bank 49 to the bottom of the bank 46, through which space the passage of gas is prevented by a plate 55 at the top of the space 54.

A coolant gas conduit 61 leads from the coolant gas outlet space 8 in the upper part of the reactor pressure vessel to the coolant gas inlet 11 at the top of the heat exchanger tower 3; a coolant gas conduit 62 leads from the coolant gas outlet 13 at the bottom of the heat exchanger tower 3 to the inlet to an axial flow motor-driven compressor 63; a coolant gas conduit 64 leads from the outlet from the compressor 63 to the inlet 51 to the heat exchanger unit 27; and a coolant gas conduit 65 leads from the outlet 52 from the heat exchanger unit 27 to the coolant gas inlet space 7 within the reactor pressure vessel. A coolant gas branch conduit 66 leads past a valve 67 therein from the conduit 64 to means 68 whereby coolant gases may be delivered by the compressor to a position in the coolant gas passage 21 between the heat exchanger units 27 and 28; the coolant gas conduit 66 is intended for use normally only upon occasions of starting up the plant.

It will be seen that coolant gas flows in a closed circuit from the reactor core 1 through the heat exchanger tower 3 and the compressor 63 and thence via the heat exchange unit 27 back to the reactor core. The coolant flow circuit described may constitute the only cooling means for the reactor; it is envisaged, however, that the closed circuit shall be one of six similar circuits all including in common the reactor pressure vessel and reactor core.

The outlet header of the heat exchange unit 22 is connected through a steam conduit 69 in which a valve 70 is placed to the high pressure stage 71 of the steam turbine 4, the low pressure stage 72 of which receives steam from the high pressure stage outlet and from the outlet header of the heat exchange unit 23 through a steam conduit 73 in which a valve 74 is placed. From the condenser 75 of the steam turbine 4 feedwater is returned to the high pressure and low pressure boilers through a condensate pump 76, a feed heating train 77 associated with appropriate turbine bleeds (not indicated) and feed pumps 78 and 79 arranged for feedwater delivery respectively to the inlet headers 42 and 44 of the heat exchange unit 28.

The valve 70 is arranged to be automatically operated to maintain constant the steam pressure in the conduit 69 on the boiler side of the valve 70. The compressor 63 is arranged to be controlled in its duty automatically, as indicated by the control line 81, in dependence upon the coolant gas temperature in the coolant gas conduit 61, while the valve 74 is automatically controlled, as indicated by the control line 82, automatically in dependence upon the coolant gas temperature in the coolant gas conduit 65. The duties of the feedwater pumps 78 and 79 are automatically controlled in a known manner in order to regulate the water levels in the high pressure and low pressure drums 32 and 35.

In operation, the compressor 63 drives coolant gas around the coolant gas closed circuit; the coolant gas, while flowing from top to bottom of the heat exchanger tower 3, transfers heat to each of the heat exchange units 22 to 28; it may, for example, entering the inlet 11 with a temperature of 800° F., fall to a temperature of 520° F. at a level in the tower between the heat exchange units 26 and 27, fall further to a temperature of 350° F. at a level between the heat exchange units 27 and 28 and leave the outlet 13 at the relatively low temperature of 250° F. The compressor handles the low temperature gases, which subsequently regain heat, to attain a temperature of, for example, 400° F., in passing through the tubes of the tube banks 46 and 49 subjected to the flow thereover of higher temperature coolant gas. In the case of a change in the coolant gas temperature in the coolant gas conduit 65 leading from the heat exchanger 27 to the reactor, the valve 74 is automatically moved in the opening or closing direction to the extent necessary, by variation of the pressure of vapour generation in the heat exchange unit 26 of the low pressure boiler, to regulate said coolant gas temperature. In case of a variation in the temperature of the coolant gas leaving the reactor the compressor 63 is automatically readjusted in operation in order, by changing the speed of the gas circulation in the gas circuit, to regulate such temperature.

Although the coolant gas at the entry to the reactor is at a temperature appropriate for the type of reactor in question, the compressor operates at a considerably lower temperature whereby it requires a substantially less power than if it operated at the gas temperature appropriate to the reactor entry.

Figure 6 illustrates the relative positioning of the reactor and the heat exchanger tower in a nuclear power station. The spherical pressure vessel 6 stands on a support 85 in a shielding housing 86 comprising a metal thermal shield 87 and concrete biological shielding 88. The roof of concrete biological shielding 88, the roof of the metal thermal shielding 87 and the uppermost cap of the spherical pressure vessel 6 are pierced for arrays of vertical charge and control tubes 89. The coolant ducts 61 and 65 enter the pressure vessel radially, run horizontally through respective apertures 90 and 91 in the thermal shield and biological shielding and include vertical lengths to take them to the proper heights for entry to the heat exchanger tower 3; the said tower is supported nearly wholly above the level of the reactor centre on a floor 92 above a blower house 93, which contains the axial flow compressor 63 and an electric driving motor 94 therefor. Concrete walls 95 surround the ducts 61 and 65 in the vicinity of the apertures 90 and 91.

With a gas-cooled reactor which permits operation with a sufficiently high gas outlet temperature therefrom, some or all of the power required by the compressor in order that it shall effect circulation of the coolant fluid in a closed circuit through the reactor core and a steam boiler or boilers may be derived from a coolant gas turbine in the circuit, which will supply power to the compressor more efficiently than will an electric motor.

Referring to Figure 7, a nuclear reactor 102 and a heat exchanger tower 103 are both traversed by coolant gas circulating in a closed circuit, whereby heat generated in the core of the reactor is conveyed to the tower and is transferred in the tower to heat exchange units 122 to 126 and 128, which are constructed as indicated with reference to the heat exchange units 22 to 26 and 28 of Figures 1 to 5, of a high pressure and a low pressure boiler arranged by appropriate conduits (not shown) to deliver superheated steam to points of use, for example, a steam turbine as described with reference to Figures 1 to 5. The heat exchange unit 127 in the heat exchanger tower 103 is a coolant gas heat exchanger constructed as indicated with reference to the heat exchange unit 27 of Figures 1 to 5. The nuclear reactor is of a kind adapted to operate under a coolant gas pressure of the order of 300 lbs. per sq. inch and with a coolant gas exit temperature of the order of 1200° F.

Within a common pressure vessel 201 there are arranged on a common shaft 202 supported in appropriate bearings (not shown) a compressor 163 for effecting circulation of the coolant gas in the closed circuit, an electric motor 194 on one side of the compressor 163 and a coolant gas turbine 203 on the other side of the compresser 163. The motor 194, compressor 163 and gas turbine 203 are located in respective compartments 204, 205 and 206 separated by partitions 207 through which the shaft extends.

A coolant gas duct 261a conveys coolant gas from the reactor to a gas turbine inlet nozzle to the pressure vessel 201, and a coolant gas conduit 261b conveys gas from a gas turbine outlet nozzle of the pressure vessel to the heat exchanger tower. A coolant gas duct 262 leads cooled gases from the heat exchanger tower outlet to a compressor inlet nozzle of the pressure vessel 201, a coolant gas conduit 264 leads gases from a compressor outlet nozzle of the pressure vessel 201 to the inlet of the heat exchange unit 127, and a coolant gas conduit 265 leads the gases from the outlet of the heat exchange unit 127 to the reactor.

In the operation of the arrangement, some of the power required to drive the compressor is obtained from the gas turbine in passing through which it is designed that the hot coolant gases suffer a temperature loss of the order of 100° F. and a pressure loss of about 50 lbs. per sq. inch. In passing through the compressor the coolant gases may be raised in pressure by about 80 lbs. per sq. inch, and in passing through the heat exchange unit 127 prior to entering the reactor at a temperature of the order of 400° F. they may be raised in temperature by about 150° F. The speed of the shaft 202 is arranged to be automatically controlled in order to regulate the coolant gas exit temperature from the reactor, steam will be taken from the high pressure boiler at a rate varied as necessary to regulate the high pressure boiler pressure, while the low pressure boiler pressure will be adjusted in order to regulate the coolant gas inlet temperature to the reactor.

It will be observed that the pressure differences across the partitions 207 are not great enough to require other than simple labyrinth glands where those partitions are penetrated by the shaft 202, and the arrangement of the rotating items within the common pressure vessel 201 avoids glands with reactor coolant on one side and atmospheric air on the other.

In a modification, where coolant gas temperatures and pressures are appropriate, the gas turbine may deliver more power than is required by the compressor, power may be taken from the shaft 202 by means of an electric generator mounted on the shaft, the motor 194 being retained, however, for starting purposes. The speed of the shaft 202 may in this modification be controlled by adjustment of the power output of the electric generator or, the gas turbine being provided with a gas by-pass, by adjusting the amount of gases by-passed.

Figure 8:
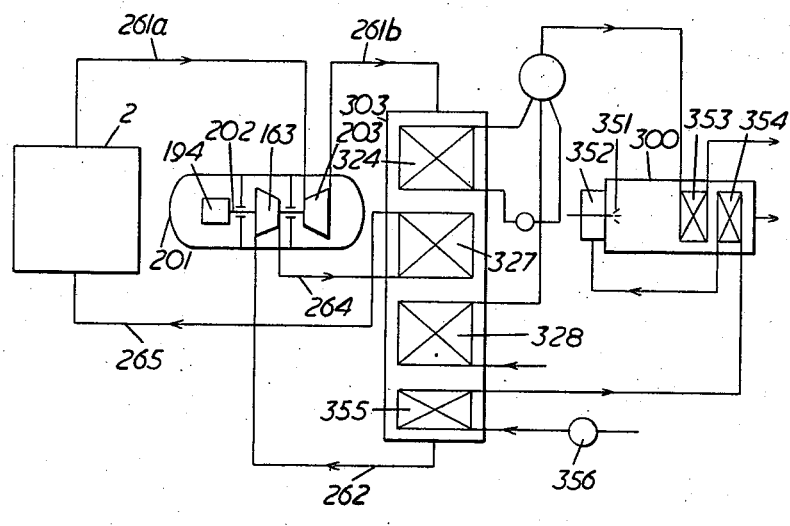
Figure 8 shows a modified arrangement in which a fuel-fired superheater is provided for a boiler heated by a nuclear reactor coolant gas.

Figure 8 relates to a modification of the arrangement of Figure 7, in which steam superheating is effected by a fuel fired superheater 300. Referring to Figure 8, the coolant gas circuit includes a nuclear reactor 2, a gas turbine 203, a heat exchanger tower 303, and a compressor 163. The turbine and compressor are arranged on a common shaft 202 on which is mounted a motor 194, these rotating items being disposed within a common pressure vessel 201.

The heat exchanger tower includes a steam generating heat exchange unit 324 and an economiser heat exchange unit 328 in the gas flow path subsequent thereto. The fuel fired superheater 300 comprises fuel delivery means 351, a wind-box 352 for the supply of combustion air to the fuel delivery means, steam superheating surfaces 353 in the combustion gas flow path and a combustion air heater 354 in the combustion gas path subsequent to the superheating surfaces 353.

Subsequent to the economiser heat exchange unit 328 in the heat exchanger tower is an air heater heat exchange unit 355; a fan 356 is provided for driving air for combustion first through the air heater heat exchange unit 355 in the heat exchanger tower, then through the air heater 354 of the compressor and to the wind-box 352.

In the coolant gas flow path in the tower between the vapour generating heat exchange unit 324 and the economiser heat exchange unit 328 there is arranged a coolant gas heat exchange unit 327 which abstracts heat from the coolant gases in the tower and delivers heat to coolant gases in the coolant gas circuit after they have left the compressor and before they reenter the reactor. Coolant gas conduits 261a, 261b, 262, 264 and 265 connect the reactor, gas turbine, tower, heat exchange unit 327, and compressor after the manner described with reference to Figure 7.

In the operation of the arrangement of Figure 8, heat generated within the reactor is used for heating and evaporating water and for heating combustion air for the superheater. The heat for raising the steam generated in the boiler to the required degree of superheat is provided by the combustion of fuel in the superheater. The rate of coolant gas circulation in the closed circuit is adjusted as necessary in order to regulate the coolant gas outlet temperature from the reactor and the boiler pressure will be adjusted as necessary in order to regulate the coolant gas inlet temperature to the reactor. The steam superheat temperature at the turbine or other steam utilisation means will be adjusted to requirements by simultaneous control of the rates of fuel and combustion air supply to the superheater.

Since the coolant gas is not called upon in this arrangement to provide steam superheat it is feasible to abstract a relatively large amount of power from the gases while they pass through the gas turbine; moreover, the compressor operates with a coolant gas temperature lower, by virtue of the heat abstraction by the air heater heat exchange unit 355, than the coolant gas temperature at the gas outlet end of the economiser heat exchange unit, and requires therefor a correspondingly lower power.

I claim:
1. Vapour generating plant including a gas-cooled nuclear reactor and a compressor arranged to effect circulation of gaseous coolant in a closed circuit through the nuclear reactor and through heat exchange means which are adapted to reduce the temperature of the coolant entering the compressor to a fully cooled value substantially below the coolant inlet temperature at the entry to the nuclear reactor and which include a vapour generator, the compressor being arranged to discharge coolant to a part of the heat exchange means adapted to raise the temperature of the fully cooled coolant flowing from the compressor to the nuclear reactor by effecting heat exchange between the fully cooled coolant and partially cooled coolant flowing to the compressor.

2. Vapour generating plant as claimed in claim 1, wherein the heat exchange means include boilers adapted to operate at different pressures and to supply vapour to a vapour turbine at different pressure stages thereof, the boiler vapour generating surfaces being disposed in succession in the coolant flow path and each succeeding boiler giving lower pressure vapour than the preceding boiler and the said part of the heat exchange means is disposed between the lowest pressure boiler and an economiser.

3. Vapour generating plant as claimed in claim 2, wherein the said economiser serves all of the boilers.

4. Vapour generating plant including a gas-cooled nuclear reactor, a compressor arranged to effect circulation of gaseous coolant in a closed circuit through the nuclear reactor, through heat exchange means which are adapted to reduce the temperature of the coolant entering the compressor to a fully cooled value substantially below the coolant inlet temperature at the entry to the nuclear reactor and which include a vapour generator and through a gas turbine disposed in the circuit between the nuclear reactor and the heat exchange means and arranged to deliver driving power to the compressor which is arranged to discharge coolant to a part of the heat exchange means adapted to raise the temperature of the fully cooled coolant flowing from the compressor by effecting heat exchange between the fully cooled coolant and partially cooled coolant flowing to the compressor.

5. Vapour generating plant as claimed in claim 4, wherein the vapour generator is arranged to supply vapour to a vapour turbine by way of a fuel-fired superheater and an air heater for heating air for combustion of the fuel by extraction of heat from the coolant is disposed in the coolant flow path between the said part of the heat exchange means and the compressor.

6. Vapour generating plant as claimed in claim 5, wherein an economiser is disposed between the air heater and the said part of the heat exchange means.

7. Vapour generating plant as claimed in claim 5, wherein a second air heater disposed in the path of combustion gases from the superheater is arranged further to heat the air for combustion.

8. Vapour generating plant as claimed in claim 4, wherein the gas turbine and compressor are disposed within a common pressure vessel.

9. The method of generating vapour under pressure in which a gaseous coolant is subjected to compression and is thereby caused to flow through and is heated in a nuclear reactor and circulated in a closed circuit including the nuclear reactor and heat exchange means by which the temperature of the coolant is regulated to a suitable value at the inlet to the nuclear reactor, the coolant in flowing from the nuclear reactor to the heat exchange means is subject to a power extraction expansion process whereby power is derived for utilisation in effecting compression of the coolant, in passing through the heat exchange means heat is extracted from the coolant to effect generation of vapour and to reduce the temperature of the coolant prior to compression thereof to a value substantially below the said predetermined temperature and, after compression, the coolant flowing to the nuclear reactor is heated by heat exchange with coolant passing, prior to the compression and after loss of heat therefrom in vapour generation, through the heat exchange means.

10. A vapour generating plant including a gas-cooled nuclear reactor and a compressor arranged to effect circulation of gaseous coolant in a closed circuit through the nuclear reactor and through heat exchange means which are adapted to reduce the temperature of the coolant entering the compressor to a fully cooled value substantially below the coolant inlet temperature at the entry to the nuclear reactor and which include a vapour generator some of the heat exchange surfaces of which constitute an economiser, the compressor being arranged to discharge coolant to a part of the heat exchange means disposed in the coolant flow path at the side of the said economiser remote from the compressor and adapted to raise the temperature of the fully cooled coolant flowing from the compressor to the nuclear reactor by effecting heat exchange between the fully cooled coolant and partially cooled coolant flowing to the compressor.

11. A vapour generating plant as claimed in claim 6, wherein a second air heater disposed in the path of combustion gases from the superheater is arranged further to heat the air for combustion.

12. Nuclear reactor power plant comprising a nuclear reactor adapted to be gas-cooled, a compressor for nuclear reactor gaseous coolant, heat exchange means including vapour generating surfaces, low temperature heat exchange surfaces, and a gas-to-gas heat exchanger, gas conduit means arranged for leading nuclear reactor gas coolant in a closed circuit from the nuclear reactor gas coolant outlet past the vapour generating surfaces, through one gas side of the gas-to-gas heat exchanger, past the low temperature heat exchange surfaces, through the compressor, through the other gas side of the gas-to-gas heat exchanger, and to the nuclear reactor gas coolant inlet, a prime mover operated by vapour, a pump for vapour generator working fluid, and conduit means arranged for leading vapour generator working fluid in a second closed circuit which includes the vapour generating surfaces, the prime mover, and the pump.

13. Nuclear reactor power plant comprising a nuclear reactor adapted to be gas cooled, a compressor for nuclear reactor gaseous coolant, heat exchange means including a gas-to-gas heat exchanger and a vapour generator including vapour generating surfaces and an economiser, gas conduit means arranged for leading nuclear reactor gaseous coolant in a closed circuit from the nuclear reactor gas coolant outlet, past the vapour generating surfaces, through one gas side of the gas-to-gas heat exchanger, past the economiser, through the compressor, through the other gas side of the gas-to-gas heat exchanger, and to the nuclear reactor gas coolant inlet, a prime mover operated by vapour, a pump for vapour generator working fluid, and conduit means arranged for leading vapour generator working fluid in a second closed circuit which includes the vapour generating surfaces, the prime mover, the pump, and the economiser.

14. Nuclear reactor power plant comprising a nuclear reactor adapted to be gas cooled, a compressor for nuclear reactor gaseous coolant, a gas turbine operated by nuclear reactor gaseous coolant and operatively connected with the compressor, heat exchanger means including vapour generating surfaces, low temperature heat exchanger surfaces, and a gas-to-gas heat exchanger, gas conduit means arranged for leading nuclear reactor gaseous coolant in a closed circuit from the nuclear reactor gas coolant outlet, through the gas turbine, past the vapour generating surfaces, through one gas side of the gas-to-gas heat exchanger, past the low temperature heat exchange surfaces, through the compressor, through the other gas side of the gas-to-gas heat exchanger and to the nuclear reactor gas inlet, a prime-mover operated by vapour, a pump for vapour generator working fluid, and conduit means arranged for leading vapour generator working fluid in a second closed circuit which includes the vapour generating surfaces, the prime mover, and the pump.

15. Nuclear reactor power plant comprising a nuclear reactor adapted to be gas cooled, a compressor for nuclear reactor gaseous coolant, a gas turbine operated by nuclear reactor gaseous coolant and operatively connected with the compressor, heat exchange means including a gas-to-gas heat exchanger and a vapour generator including vapour generating surfaces and an economiser, gas conduit means arranged for leading nuclear reactor gaseous coolant in a closed circuit from the nuclear reactor gas coolant outlet through the gas turbine, past the vapour generating surfaces, through one gas side of the gas-to-gas heat exchanger, past the economiser, through the compressor, through the other gas side of the gas-to-gas heat exchanger, and to the nuclear reactor gas coolant inlet, a prime mover operated by vapour, a pump for vapour generator working fluid, and conduit means arranged for leading vapour generator working fluid in a second closed circuit which includes the vapour generator surfaces, the prime mover, the pump, and the economiser.

References Cited in the file of this patent

Nucleonics, vol. 11, No. 6, June 1953, page 34.

Proceedings of the International Conference on the Peaceful Uses of Atomic Energy, vol. III. Article by Hinton. Held in Geneva, August 8–20, 1955, United Nations, N.Y., 1956, pages 325–327.

Facts About Con Edison's Indian Point Nuclear Electric Generating Station, September 1955, page 4.